(12) United States Patent
McEwen (10) Patent No.: US 10,562,043 B2
(45) Date of Patent: Feb. 18, 2020

(54) TELESCOPING ASPIRATOR SYSTEM

(71) Applicant: GOODRICH CORPORATION, Charlotte, NC (US)

(72) Inventor: Jim McEwen, Tempe, AZ (US)

(73) Assignee: GOODRICH CORPORATION, Charlotte, NC (US)

(*) Notice: Subject to any disclaimer, the term of this patent is extended or adjusted under 35 U.S.C. 154(b) by 272 days.

(21) Appl. No.: 15/712,833

(22) Filed: Sep. 22, 2017

(65) Prior Publication Data

US 2019/0091704 A1 Mar. 28, 2019

(51) Int. Cl.
| | | |
|---|---|---|
| *B05D 1/00* | (2006.01) | |
| *F04F 5/46* | (2006.01) | |
| *B05B 1/00* | (2006.01) | |
| *F04F 5/20* | (2006.01) | |
| *B64D 25/14* | (2006.01) | |

(52) U.S. Cl.
CPC .............. *B05B 1/005* (2013.01); *F04F 5/20* (2013.01); *F04F 5/461* (2013.01); *B64D 25/14* (2013.01)

(58) Field of Classification Search
CPC ..... F04F 5/16; F04F 5/20; F04F 5/461; B05B 1/005; B64D 25/14

USPC ................................................ 417/182, 185
See application file for complete search history.

(56) References Cited

U.S. PATENT DOCUMENTS

| | | | |
|---|---|---|---|
| 3,460,746 A | | 8/1969 | Green et al. |
| 3,468,472 A | * | 9/1969 | Hahn ...................... F04F 5/461 417/191 |
| 4,566,862 A | * | 1/1986 | Halavais ................... F04F 5/48 417/174 |
| 6,071,084 A | * | 6/2000 | Wass ....................... F04F 5/463 137/888 |
| 8,322,996 B2 | * | 12/2012 | McNeil .................. B64D 25/14 137/889 |
| 2010/0266424 A1 | | 10/2010 | Renz et al. |
| 2017/0016459 A1 | * | 1/2017 | Ruegsegger .............. F04F 5/48 |
| 2017/0304663 A1 | * | 10/2017 | Khazova ................. B05B 15/70 |

* cited by examiner

*Primary Examiner* — Charles G Freay
(74) *Attorney, Agent, or Firm* — Snell & Wilmer, L.L.P.

(57) ABSTRACT

An aspirator system includes an aspirator body having a longitudinal axis. A channel configured for telescoping expansion and contraction along the longitudinal axis includes a first tapered tube section with a proximal end secured to an outflow region of the aspirator body. A second tapered tube section is disposed in telescoping engagement with the first tapered tube section. A drag assembly is secured to a distal end of the second tapered tube section.

19 Claims, 8 Drawing Sheets

TELESCOPING ASPIRATOR SYSTEM

FIELD

The present disclosure relates to aspirator systems and, more particularly, telescoping aspirator systems used to inflate emergency evacuation or rescue devices.

BACKGROUND

Inflatable emergency evacuation and rescue equipment, including, without limitation, aircraft evacuation slides, emergency life rafts and similar equipment, typically require rapid inflation before use. A charged cylinder of compressed gas and an aspirator may be used for such rapid inflation. The emergency evacuation and rescue equipment is typically stored in a limited packing space and thus is often densely packaged. The high package density may lead to various issues including cracked aspirators, which may be fragile.

SUMMARY

In accordance with various embodiments, an aspirator system includes an aspirator body having a longitudinal axis, a channel configured for telescoping expansion and contraction along the longitudinal axis, and a drag assembly secured to a distal or downstream end of the channel. In various embodiments, the channel includes a first section having a proximal end secured to an outflow region of the aspirator body and a second section configured for telescoping engagement with the first section, the second section having the distal or downstream end. A third or additional sections configured for telescoping engagement between the first section and the second section may be incorporated into the system.

In various embodiments, the first section includes a tapered tube having a distal radius and a proximal radius and the second section comprises a tapered tube having a distal radius and a proximal radius. The distal radius of the first section is greater in value than the proximal radius of the second section.

In various embodiments, the drag assembly includes a plurality of drag tabs spaced about a perimeter of the distal end of the second section of the channel. The plurality of drag tabs may be spaced equidistantly about the perimeter of the distal end of the second section of the channel. In various embodiments, the drag assembly includes a disc or drag inducing body disposed proximate a center portion of the drag assembly. In various embodiments, the drag assembly comprises a drag tab having a circumferential width and a disc having a diameter about equal in size to the circumferential width.

In various embodiments, the distal end of the second section may have a circumference defined by a distal radius and the drag assembly may comprise a drag tab having a radial length less than the distal radius. The drag assembly may also comprise a plurality of drag tabs each having a radial length less than the distal radius. In various embodiments, the drag assembly may include a disc disposed perpendicular to the longitudinal axis. The plurality of drag tabs may also have a first end secured to the second section and a second end secured to the disc.

In accordance with various embodiments, an aspirator system includes an aspirator body having a longitudinal axis and a channel configured for telescoping expansion and contraction along the longitudinal axis. The channel may include a first tapered tube section having a proximal end secured to an outflow region of the aspirator body and a second tapered tube section configured for telescoping engagement with the first tapered tube section. A drag assembly may be secured to a distal end of the second tapered tube section.

In various embodiments, the distal end of the second tapered tube section has a circumference defined by a distal radius and the drag assembly comprises a drag body disposed at a radially inward center of the circumference. The drag assembly may include a plurality of spokes. Each of the plurality of spokes may have a first end secured to the distal end of the second tapered tube section and a second end secured to the drag body. In various embodiments, the drag body is a drag inducing body, such as a sphere or hemisphere. In various embodiments, the drag body is a disc.

In accordance with various embodiments, an aspirator system includes an aspirator body having a longitudinal axis and a channel configured for telescoping expansion and contraction along the longitudinal axis. The channel may include a first tapered tube section having a proximal end secured to an outflow region of the aspirator body, a second tapered tube section positioned coaxially and configured for telescoping engagement with the first tapered tube section, a third tapered tube section positioned coaxially and configured for telescoping engagement with the second tapered tube section and a fourth tapered tube section positioned coaxially and configured for telescoping engagement with the third tapered tube section, the fourth tapered tube section having a distal end. A drag assembly may be secured to the distal end of the fourth tapered tube section.

In various embodiments, the first tapered tube section includes a first wall and a distal radius measured from the longitudinal axis to an outer surface of the first wall. The second tapered tube section includes a second wall and a proximal radius measured from the longitudinal axis to an inner surface of the second wall. The distal radius of the first tubular section is greater in value than the proximal radius of the second tubular section. In various embodiments, the drag assembly includes a plurality of drag tabs.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical and mechanical changes may be made without departing from the scope of the disclosure. Thus, the detailed description herein is presented for purposes of illustration only and not of limitation.

All ranges described herein may include the upper and lower values, and all ranges and ratio limits disclosed herein may be combined. Further, unless specifically stated otherwise, references to "a," "an" or "the" may include the singular and the plural—i.e., the reference may refer to one or more than one. In addition, any reference to singular embodiments includes plural embodiments, and any reference to more than one component or step may include a singular embodiment or step. Also, any reference to attached, fixed, connected, or the like may include permanent, removable, temporary, partial, full or any other possible attachment option. Any reference to without contact (or similar phrases) may also include reduced contact or minimal contact.

Figure 1:
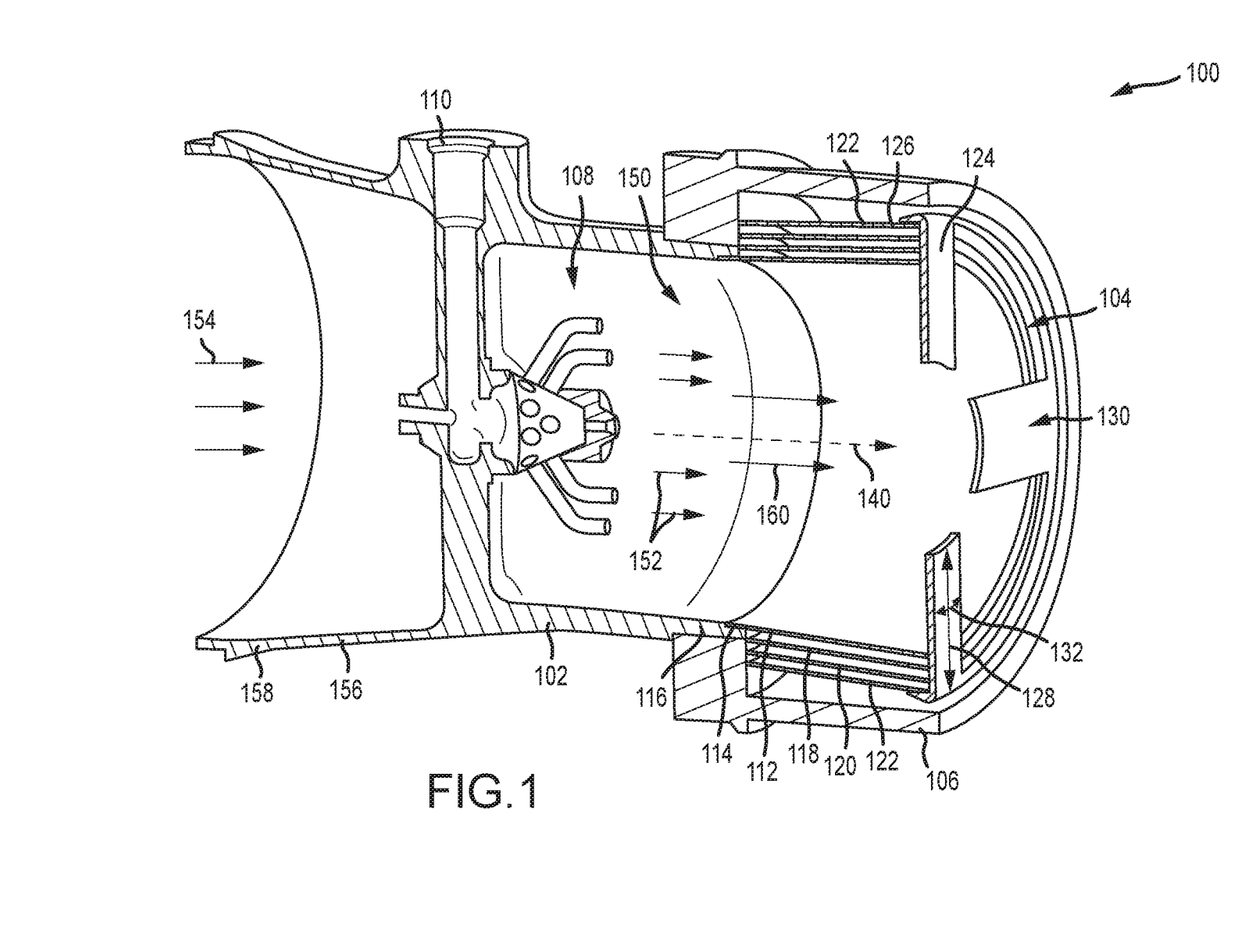
FIG. 1 is a perspective cutaway view of an aspirator system having a telescoping aspirator channel shown in a collapsed state in accordance with various embodiments.

Referring now to FIG. 1, an aspirator system 100 having a telescoping aspirator channel shown in a collapsed state is illustrated in accordance with various embodiments. The aspirator system 100 includes an aspirator body 102, a telescoping channel 104 and a channel housing 106. In various embodiments, the aspirator body 102 and telescoping channel 104 establish a flow channel having a longitudinal axis 140. The telescoping channel 104 is configured to expand and collapse along the longitudinal axis 140 as described in further detail below. The aspirator body 102 generally houses a nozzle assembly 108 which, in various embodiments, may be coupled to a source of high-pressure gas via a gas inlet 110. The source of high-pressure gas may, in various embodiments, comprise a canister or cylinder of compressed gas, such as, for example, a compressed mixture of nitrogen and carbon dioxide. In typical applications, the channel housing 106 is mounted to an inflatable device, such as an aircraft evacuation slide or emergency life raft, and serves to protect internal components, such as the components comprising the telescoping channel 104. The aspirator body 102, telescoping channel 104 and channel housing 106 may be constructed of any suitable materials, such as metal, plastic or the like. Methods of manufacturing the various components include injection molding, spin forming and additive processes.

Still referring to FIG. 1, the channel housing 106 may house the telescoping channel 104 while in a collapsed state. In various embodiments, the telescoping channel 104 includes a first or an innermost telescoping section 112 having a proximal portion 114 secured to an outflow region 116 of the aspirator body 102. The telescoping channel 104 may further include a second telescoping section 118, a third telescoping section 120 and a fourth or an outermost telescoping section 122. The number of telescoping sections may be greater than or fewer than the four sections illustrated in FIG. 1, including odd or even numbers of telescoping sections. In addition, while the telescoping sections are shown generally circular or tubular, the telescoping sections may be of any other suitable shape, such as elliptical or of any n-sided polygonal shape, such as triangular or rectangular. In general, the telescoping sections are coaxial with one another.

In various embodiments, one or more drag tabs 124 are secured to a distal portion 126 of the fourth or outermost telescoping section 122. In various embodiments, the drag tabs 124 have a radial length 128 and a circumferential width 132. As illustrated in FIG. 1, the drag tabs 124 may be disposed and spaced equidistant or approximately equidistant about a circumference of a distal (or downstream) portion 126 of the fourth or outermost telescoping section 122. In various embodiments, the number of drag tabs 124 may be greater than or fewer than the four drag tabs illustrated in FIG. 1, including odd or even numbers of drag tabs. Further, the drag tabs 124 need not be spaced equidistantly about the circumference of the outermost telescoping section 122. In general, the drag tabs 124 comprise a portion of a drag assembly 130 positioned proximate the distal portion 126 of the outermost telescoping section 122.

In operation, the nozzle assembly 108 directs high-pressure gas received from the gas inlet 110 into a flow channel 150 formed by the aspirator body 102 and the telescoping channel 104. The high-pressure gas introduced into the flow channel 150 establishes a primary flow 152, comprising a jet stream of gas traveling downstream (along the longitudinal axis 140) at high velocity, first into the aspirator body 102 and then into the telescoping channel 104. The primary flow 152 entering the flow channel 150 causes the pressure in the flow channel 150 to drop relative to, for example, a source of atmospheric air at atmospheric pressure at an inlet region 158 of the aspirator body 102. Atmospheric air is then caused to be aspirated, or drawn or entrained, through the inlet region 158 of the aspirator body 102, causing a secondary flow 154 to be established in an upstream portion 156 of the aspirator body 102 and become part of a total gas flow 160 through the flow channel 150.

Figure 2A:
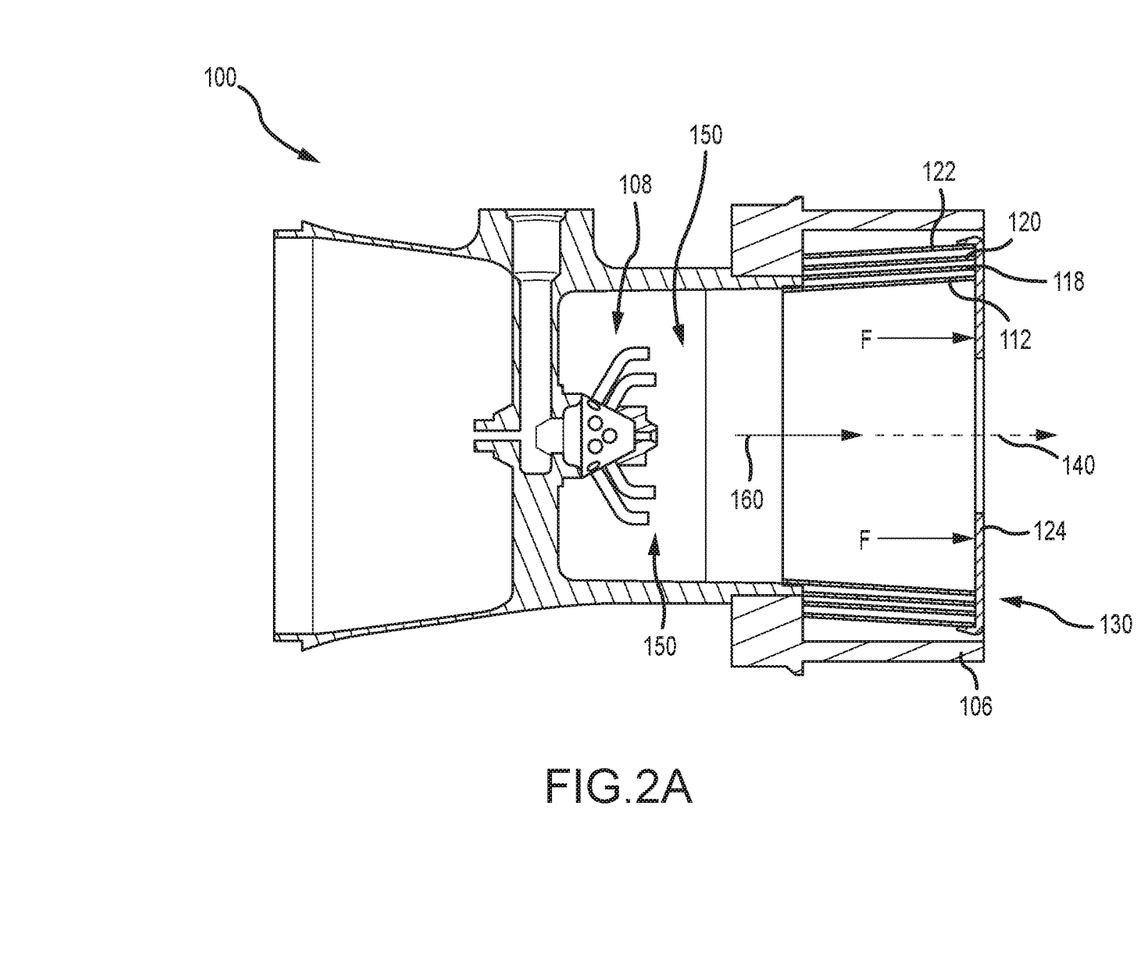
FIGS. 2A, 2B, 2C and 2D illustrate cross sectional views of an aspirator system having a telescoping aspirator channel shown in various states between being collapsed and extended in accordance with various embodiments.

Referring now generally to FIGS. 2A-2D, the aspirator system 100 is illustrated during various stages of expansion. Referring to FIG. 2A, the aspirator system 100 is illustrated in a fully collapsed state. More specifically, the first or innermost telescoping section 112, the second telescoping section 118, the third telescoping section 120 and the fourth or outermost telescoping section 122 are positioned adjacent one another and enclosed within the channel housing 106. To commence operation, a regulator or similar device opens a passage from the source of high-pressure gas to the nozzle assembly 108. As the gas flow 160 within the flow channel 150 becomes established, a force (F) is imposed on the drag tabs 124 in the direction of the longitudinal axis 140. The imposed force (F) is an aerodynamic force resulting from the flow of gas impinging upon and flowing around the drag assembly 130 or, in various embodiments, the drag tabs 124. As the imposed force (F) develops, the resulting load on the drag assembly 130 causes the fourth or outermost telescoping section 122 to translate downstream in the direction of the longitudinal axis 140.

Figure 2B:
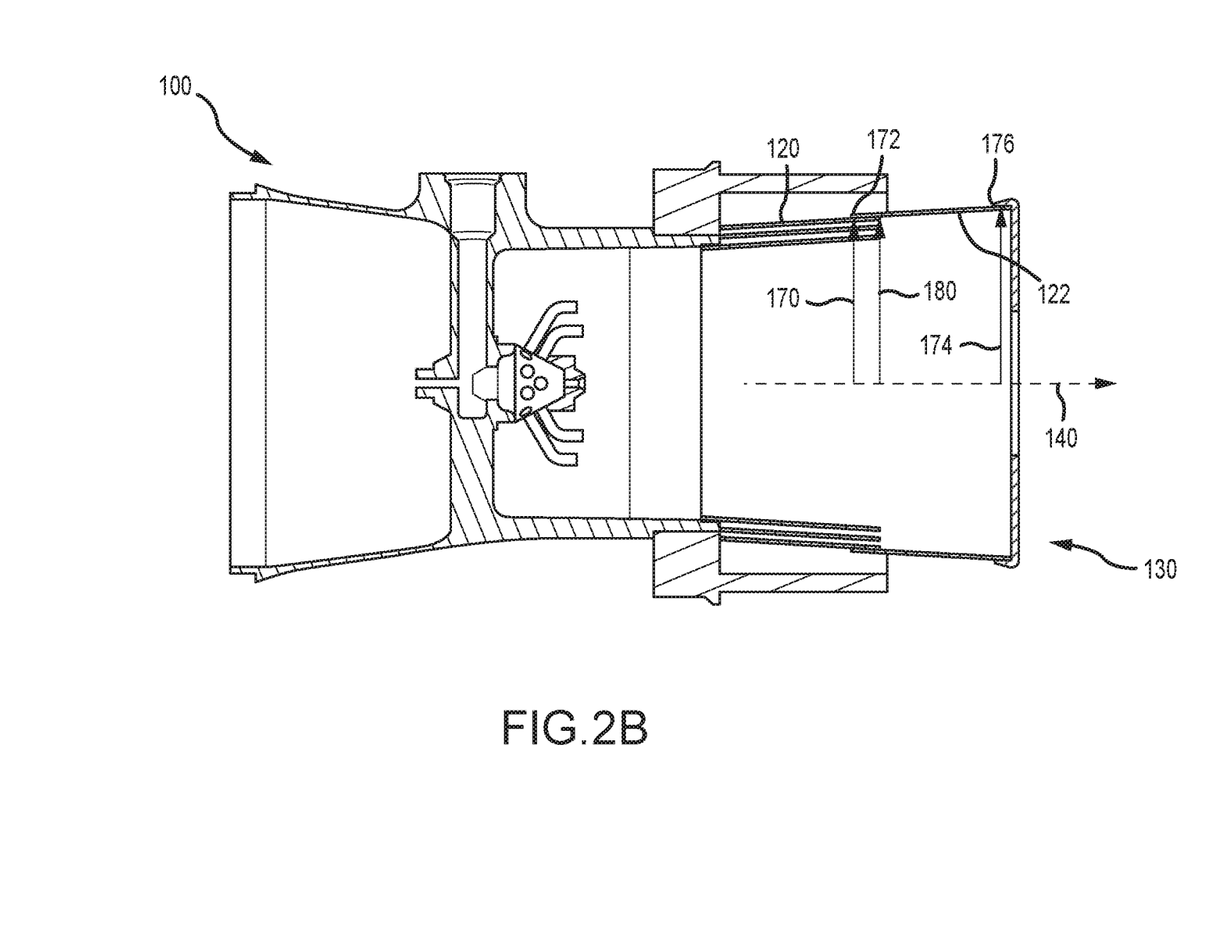

Referring now to FIGS. 2A and 2B, the fourth or outermost telescoping section 122 translates in the axial direction 140 until contact is made with the next inner telescoping section—e.g., the third telescoping section 120. In various embodiments, each of the telescoping sections is cylindrical and, more specifically, each comprises a tapered tube geometry. For example, referring to FIG. 2B, the fourth or outermost telescoping section 122 includes a proximal radius 170, measured from the longitudinal axis 140 radially outward to an inner surface at a proximal end 172 of the tapered tube. The fourth telescoping section 122 further includes a distal radius 174, measured from the longitudinal axis 140 radially outward to an outer surface at a distal end 176 of the tapered tube. Similarly, the third telescoping section 120 includes a distal radius 180. As used herein, distal generally refers to upstream with respect to the direction of flow while proximal generally refers to downstream.

In various embodiments, the distal radius of a tapered tube—e.g., the distal radius 180 of the third telescoping section 120—is dimensioned such that its radial value is greater than the radial value of the proximal radius of an adjacent (and downstream) tapered tube—e.g., the proximal radius 170 of the fourth telescoping section 122. With the radial values of adjacent tapered tubes—e.g., the third 120 and fourth 122 telescoping sections—selected as above described, the inner surface of the outer telescoping section (or tapered tube) of an adjacent pair of telescoping sections will engage with the outer surface of the inner telescoping section (or tapered tube) of the adjacent pair. In various embodiments, the mode of engagement between the outer and inner surfaces of adjacent telescoping sections will be frictional engagement. While the foregoing description specifies measuring proximal and distal radii of the various tapered tube segments from the longitudinal axis to the inner and the outer wall surfaces, respectively, those skilled in the art will recognize that for sufficiently thin tube walls the radii may be measured from the longitudinal axis to the center of the wall thickness or to either the inner or outer surfaces of the tube walls without contradicting the principles or the embodiments disclosed herein.

Figure 2C:
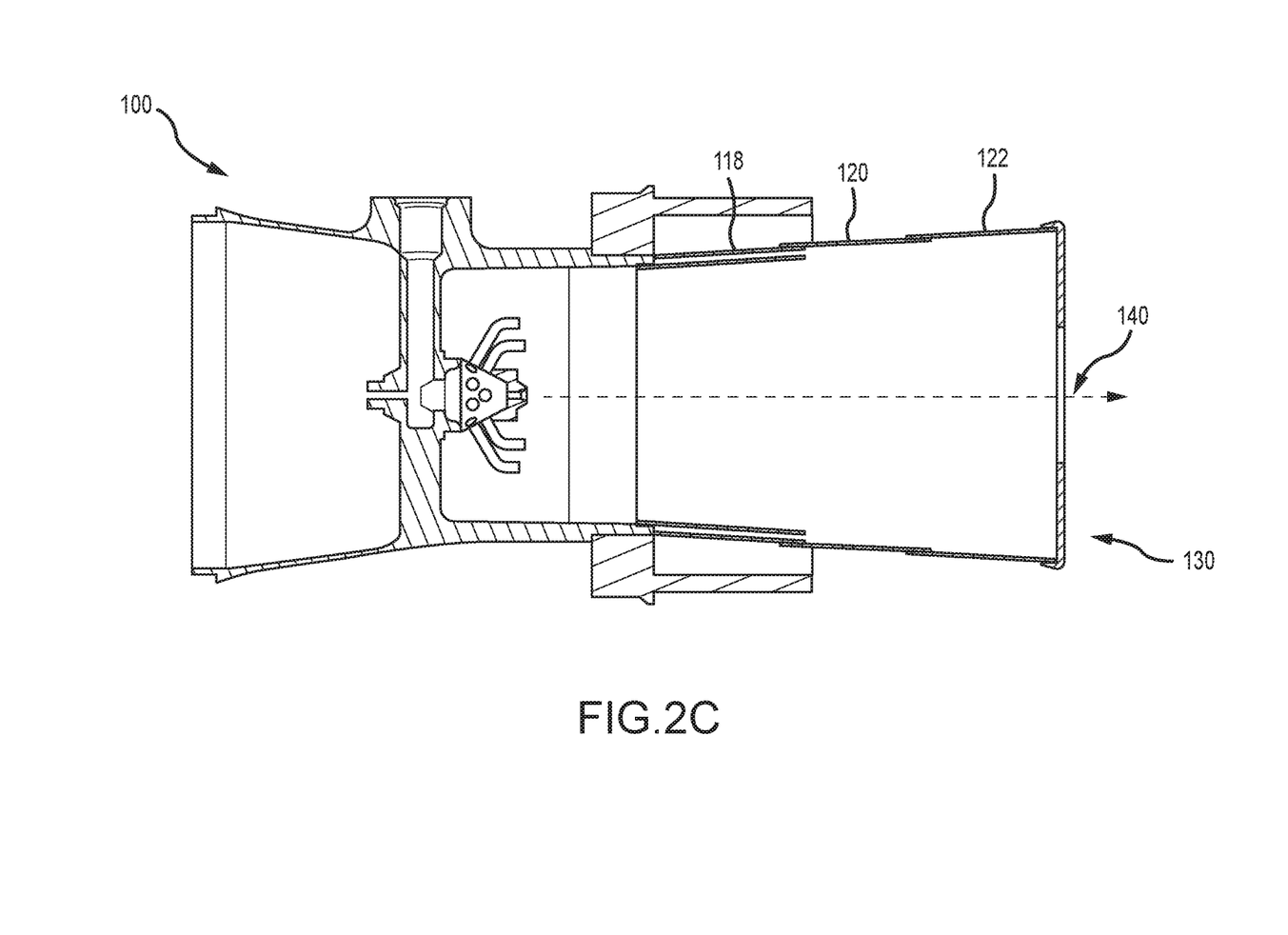
Figure 2D:
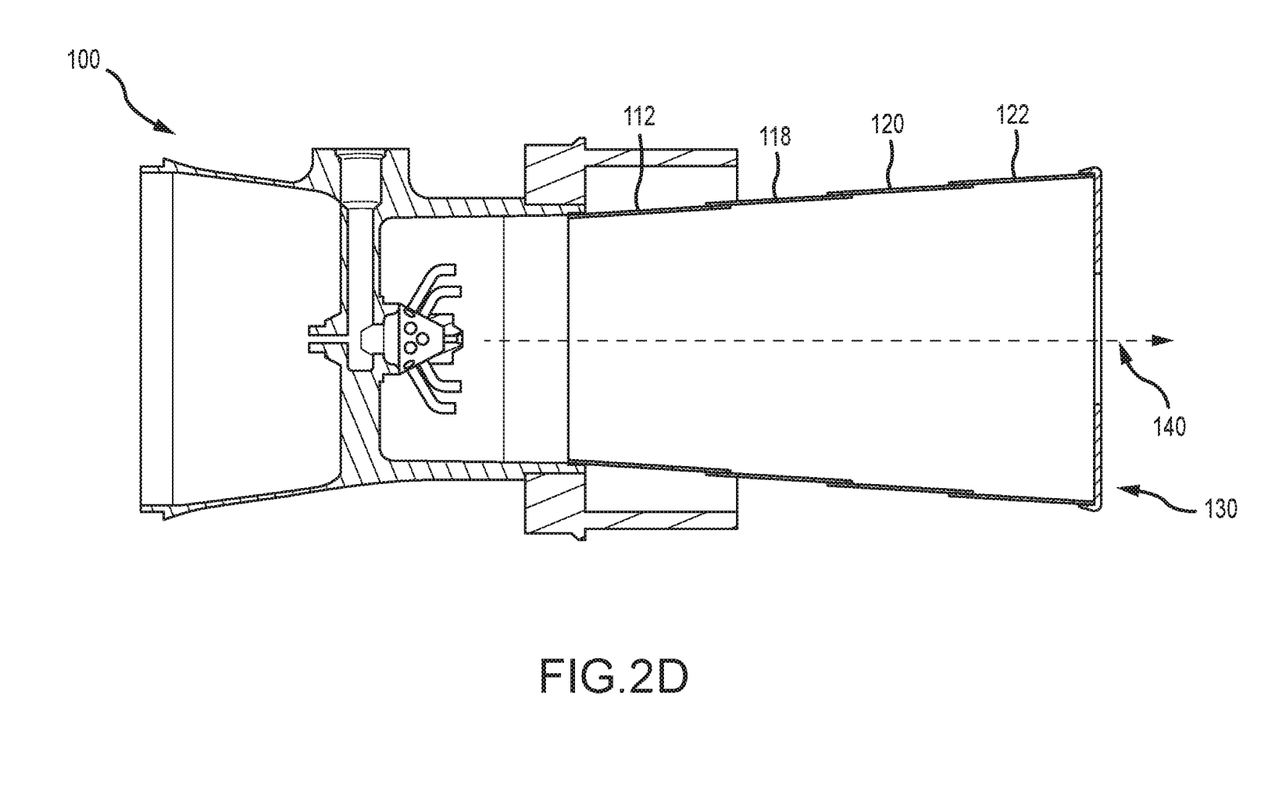

Referring again to FIGS. 2A-2D, the above description can be understood more fully with reference to the various stages of expansion of the telescoping channel 104 of the aspirator system 100. FIG. 2B, for example, illustrates translation in the direction of the longitudinal axis 140 of the fourth or outermost telescoping section 122 until engagement with the third telescoping section 120 occurs. At this juncture, both the fourth or outermost telescoping section 122 and the third telescoping section 120 translate as a unit until engagement between the third telescoping section 120 and the second telescoping section 118 occurs, as illustrated in FIG. 2C. At this juncture, the second 118, third 120 and fourth or outermost 122 telescoping sections translate as a unit until engagement between the second telescoping section 118 and the first or innermost telescoping section 112 occurs, as illustrated in FIG. 2D. The expansion of the telescoping channel 104 is complete when each of the adjacent pairs of telescoping sections is engaged with one another as described above. The various sections of the telescoping channel 104 may subsequently be collapsed or retracted by applying a load to the drag assembly 130 in the reverse direction along the longitudinal axis 140.

Figure 3:
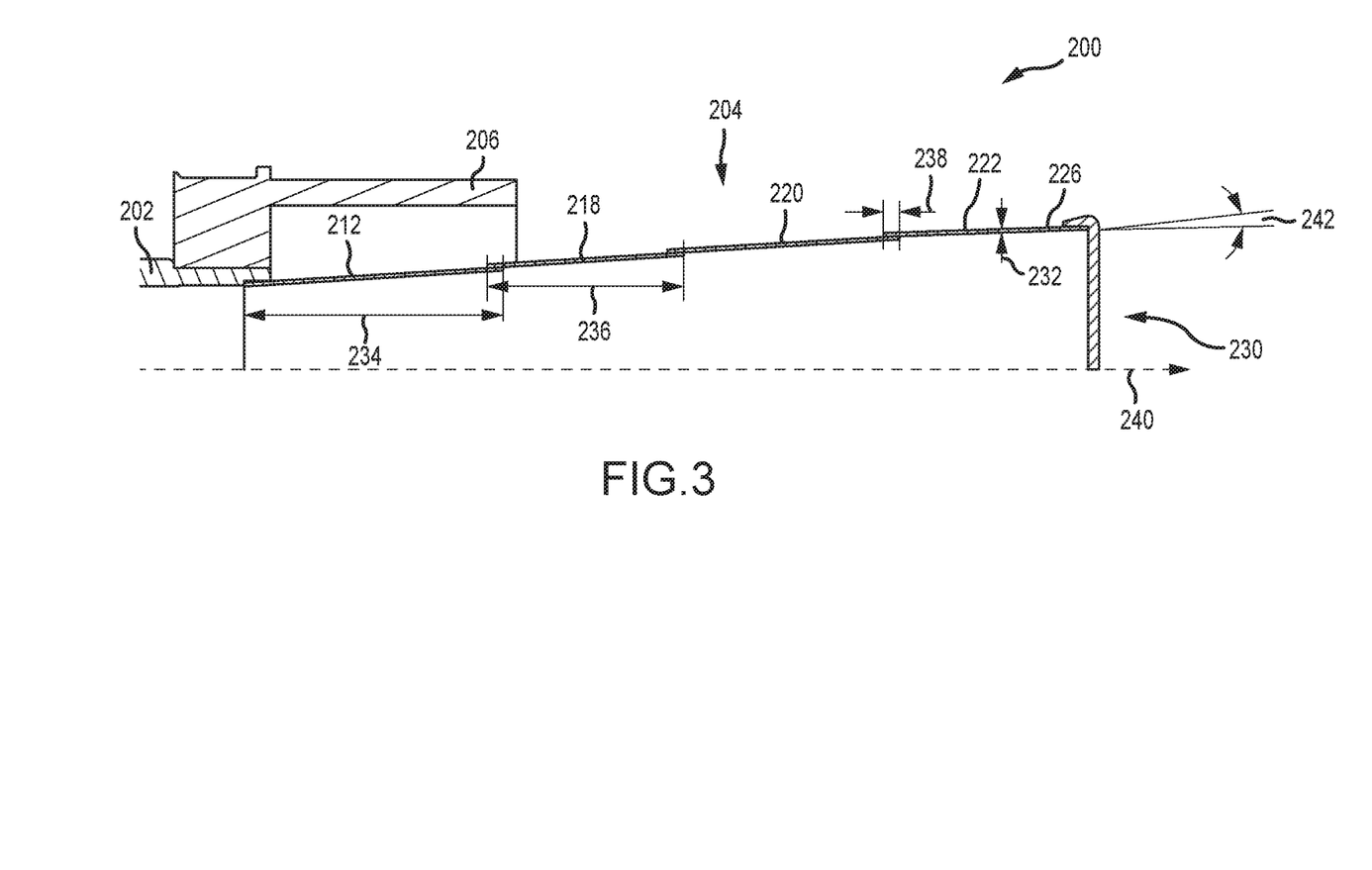
FIG. 3 is a cross sectional view of an aspirator system having a telescoping aspirator channel shown in an extended state in accordance with various embodiments.

Referring now to FIG. 3, a cross sectional drawing of an aspirator system 200 in accordance with various embodiments is provided. The aspirator system 200 includes an aspirator body 202, a telescoping channel 204 and a channel housing 206. The telescoping channel 204, illustrated in an extended state, includes a first or innermost tapered tube section 212, a second tapered tube section 218, a third tapered tube section 220 and a fourth or outermost tapered tube section 222. Each of the tapered tube sections is dimensioned to provide frictional engagement between adjacent pairs of the sections. A drag assembly 230 is secured to a distal end 226 of the fourth or outermost tapered tube section 222.

The frictional engagement between adjacent pairs of sections facilitates a "self-locking" feature of the device, which is also facilitated by slight taper of the tapered tube sections. The slight taper of the segments tend to enable adjacent pairs a segments to lock to one another in the extended position. This feature stabilizes the assembly of tapered tubes in the extended configuration and prevents disruption of the flow channel due to movement of the aspirator assembly as the evacuation device inflates.

In various embodiments, each of the tapered tube sections has a wall thickness 232 equal to about 0.015 inches (0.38 mm). The first tapered tube section 212 has a wall length 234 of about 2.529 inches (64.23 mm), with a tolerance of ±0.005 inches (0.127 mm). The second 218, third 220 and fourth 222 tapered tube sections have a wall length 236 of about 2.279 inches (57.88 mm), with a tolerance of ±0.005 inches (0.127 mm). The first or innermost tapered tube section 212 has a proximal inner diameter of about 3.929 inches (99.79 mm) and a distal inner diameter of about 4.228 inches (107.39 mm). The second tapered tube section 218 has a proximal inner diameter of about 4.212 inches (106.98 mm) and a distal inner diameter of about 4.490 inches (114.04 mm). The third tapered tube section 220 has a proximal inner diameter of about 4.474 inches (113.63 mm) and a distal inner diameter of about 4.752 inches (120.70 mm). The fourth or outermost tapered tube section 222 has a proximal inner diameter of about 4.736 inches (120.29 mm) and a distal inner diameter of about 5.014 inches (127.35 mm). A tolerance for each of the tapered tube section dimensions is ±0.005 inches (0.127 mm). In various embodiments, each of the adjacent pairs of tapered tube sections has an overlap length 238 in the extended state equal to about 0.375 inches (9.52 mm). In various embodiments, a tapered tube wall slope angle 242 with respect to the longitudinal axis 240 is about 3.5 degrees.

Figure 4:
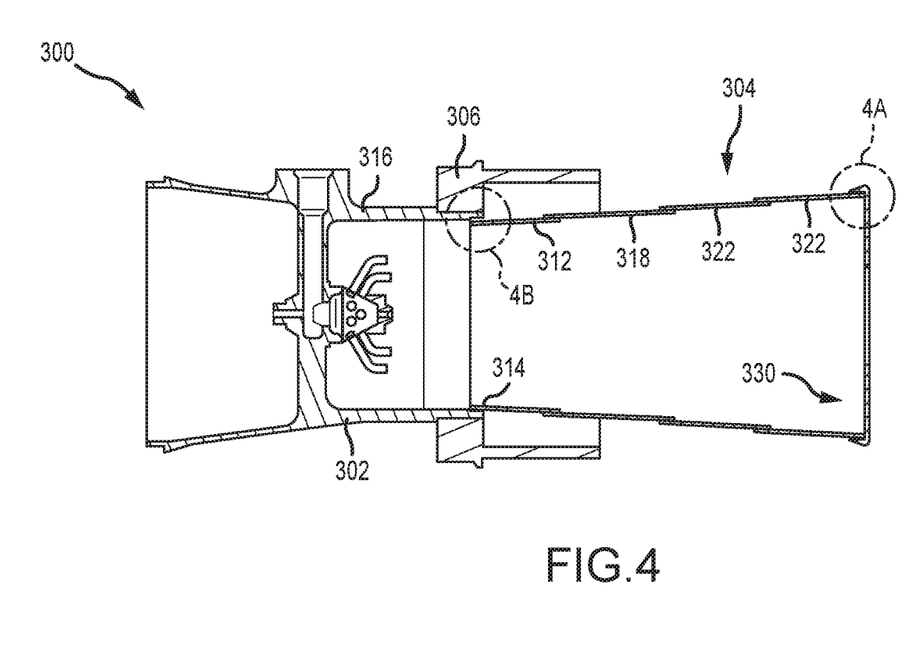
FIG. 4 is a cross sectional view of an aspirator system having a telescoping aspirator channel in accordance with various embodiments.

Referring now to FIG. 4, a cross sectional drawing of an aspirator system 300 in accordance with various embodiments is provided. The aspirator system 300 includes an aspirator body 302, a telescoping channel 304 and a channel housing 306. The telescoping channel 304 is illustrated in an extended state. The telescoping channel 304 includes a first or innermost tapered tube section 312, a second tapered tube section 318, a third tapered tube section 320 and a fourth or outermost tapered tube section 322. Each of the tapered tube sections is dimensioned to provide frictional engagement between adjacent pairs of the sections. A drag assembly 330 is secured to a distal end 326 of the fourth or outermost tapered tube section 222. A proximal end 314 of the first or innermost tapered tube 312 is secured to an outflow region 316 of the aspirator body 302.

Figure 4A:
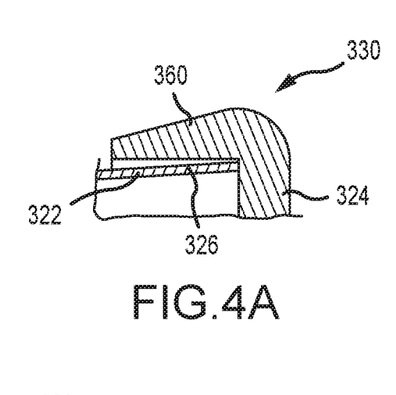
FIG. 4A is a cross sectional view of an attachment between a tapered tube section and a drag assembly in accordance with various embodiments.

Referring now to FIG. 4A, an enlarged depiction of the attachment section for attaching the drag assembly 330 to the fourth or outermost tapered tube section 322 is illustrated. In various embodiments, the drag assembly 330 includes a hook portion 360 that overlaps a distal end 326 of the fourth or outermost tapered tube section 322. The drag assembly 330 may be attached to the fourth or outermost tapered tube section 322 using an adhesive. For example, in various embodiments, the hook portion 360 may be bonded to the distal end 326 using a bonding adhesive, such as one containing tetrachloroethylene and/or styrene butadiene copolymer, such as that sold under the mark E6000®, manufactured by Eclectic Products, Inc. In various embodiments, the drag assembly 330 may be attached to the fourth or outermost tapered tube section 322 using threads on the various surfaces—such as, for example, an exterior surface of the fourth or outermost tapered tube section 322 and an interior surface of the hook portion 360. In various embodiments, snap fasteners, lock pins, rivets, bolts or the like may be used to attach the drag assembly 330 to the fourth or outermost tapered tube section 322.

Figure 4B:
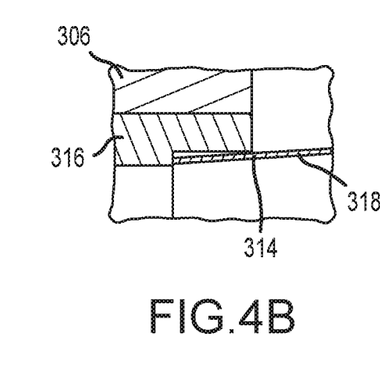
FIG. 4B is a cross sectional view of an attachment between a tapered tube section and an aspirator body in accordance with various embodiments.

Referring now to FIG. 4B, an enlarged depiction of the attachment section for attaching the first or innermost tapered tube section 312 to an outflow region 316 of the aspirator body 302. In various embodiments, the first or innermost tapered tube section 312 includes a proximal end 314 that overlaps the outflow region 316 of the aspirator body 302. The proximal end 314 may be attached to the outflow region 316 of the aspirator body 302 using an adhesive. For example, in various embodiments, the proximal end 314 may be bonded to the outflow region 316 of the aspirator body 302 using a bonding adhesive, such as one containing tetrachloroethylene and/or styrene butadiene copolymer, such as E6000®. In various embodiments, the aspirator body 302 may be attached to the first or innermost tapered tube section 312 using threads on the various surfaces—such as, for example, an exterior surface of the first or innermost tapered tube section 312 and an interior surface of the aspirator body 302. In various embodiments, snap fasteners, lock pins, rivets, bolts or the like may be used to attach the aspirator body 302 to the first or innermost tapered tube section 312.

Figure 5A:
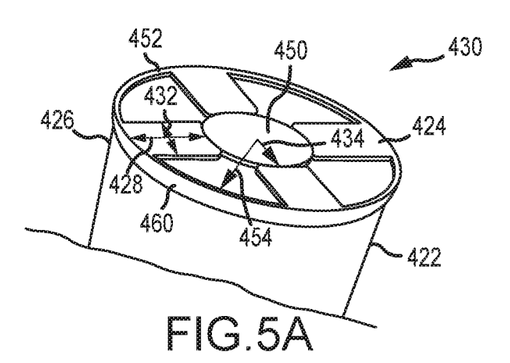
FIGS. 5A, 5B, 5C and 5D are perspective views of drag assemblies in accordance with various embodiments.

Referring now to FIGS. 5A-5D, alternative drag assemblies are illustrated in accordance with various embodiments. Referring to FIG. 5A, a drag assembly 430 is illustrated. The drag assembly 430 is disposed, in various embodiments, at a distal end 426 of an outermost tapered tube section 422. The drag assembly 430 includes a plurality of drag tabs 424 circumferentially arranged about a perimeter 452 of the drag assembly 430. Each of the drag tabs 424 extends radially inward from the perimeter 452. In various embodiments, the perimeter 452 is circular and may be defined by a distal radius 454. The drag tabs 424 may include a radial length 428 and a circumferential width 432. In various embodiments, the drag assembly 430 includes a drag body. For example, the drag body may include a disc 450 disposed proximate the center of the drag assembly 430. The disc 450 includes a disc radius 434, which may range from a value near the distal radius 454 to a value near zero. In various embodiments, the disc radius 434 has a value equal to about one-half the circumferential width 432 of the drag tabs 424; or, stated otherwise, the diameter of the disc 450 is about the same as the circumferential width 432. In various embodiments, the perimeter 452 of the drag assembly 430 is defined by a hook portion 460 that may be adhered or otherwise fastened to the distal end of the outermost tapered tube section 422 as described above. While the hook portion 460 is illustrated extending circumferentially over the tapered tube section about the entire perimeter 452 of the drag assembly 430, various embodiments comprise hook portions that extend over the tapered tube section only in the region of the drag tabs. In various embodiments, the disc 450 may be adhered to the drag tabs or formed integrally with the drag tabs.

Figure 5B:
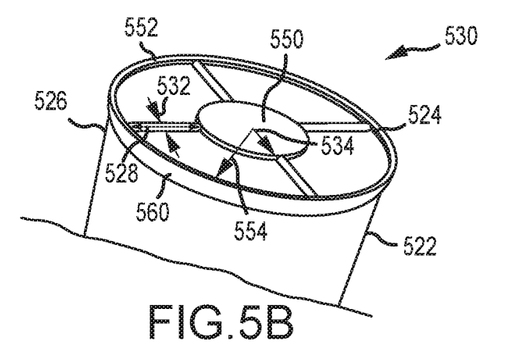

Referring to FIG. 5B, a drag assembly 530 is illustrated. The drag assembly 530 is similar to that described above with reference to FIG. 5A, with an exception being that the drag tabs 424 are replaced with spokes 524. The drag assembly 530 is disposed, in various embodiments, at a distal end 526 of an outermost tapered tube section 522. The drag assembly 530 includes a plurality of spoke members 524 circumferentially arranged about a perimeter 552 of the drag assembly 530. Each of the spoke members 524 extends radially inward from the perimeter 552. In various embodiments, the perimeter 552 is circular and may be defined by a distal radius 554. The spoke members 524 may include a radial length 528 and a diameter 532. In various embodiments, the drag assembly 530 includes a drag body. For example, the drag body may include a disc 550 disposed proximate the center of the drag assembly 530. The disc 550 includes a disc radius 534, which may range from a value near the distal radius 554 to a value near zero. In various embodiments, the disc radius 534 has a value equal to about one-third to about one-half the distal radius 554. In various embodiments, the perimeter 552 of the drag assembly 530 is defined by a hook portion 560 that may be adhered or otherwise fastened to the distal end of the outermost tapered tube section 522 as described above. While the hook portion 560 is illustrated extending circumferentially over the tapered tube section about the entire perimeter 552 of the drag assembly 530, various embodiments comprise hook portions that extend over the tapered tube section only in the region of the spokes. In various embodiments, the disc 550 may be adhered to the spokes or formed integrally with the spokes.

Figure 5C:
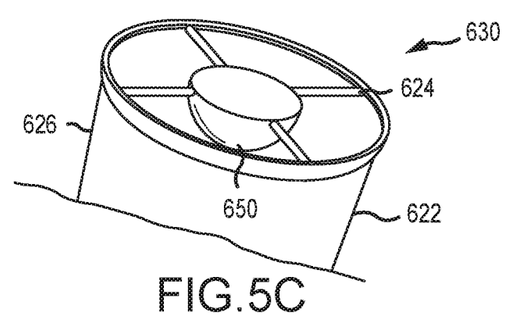
Figure 5D:
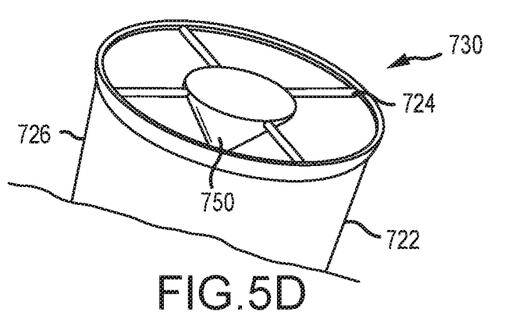

Referring now to FIGS. 5C and 5D, drag assemblies similar to the embodiments above described are illustrated. For example, referring to FIG. 5C, an embodiment of a drag assembly 630 is illustrated. The drag assembly 630 includes a plurality of spokes 624 secured to a distal end 626 of an outermost tapered tube section 622. A drag body in the form of a hemisphere 650 is positioned proximate a center portion of the drag assembly 630. In various embodiments, the hemisphere is either solid or hollow and the base of the hemisphere faces either toward or away from the aspirator body. Similarly, with reference to FIG. 5D, an embodiment of a drag assembly 730 is illustrated. The drag assembly 730 includes a plurality of spokes 724 secured to a distal end 726 of an outermost tapered tube section 722. A drag body in the form of a cone 750 is positioned proximate a center portion of the drag assembly 730. In various embodiments, the cone is either solid or hollow and the base of the faces faces either toward or away from the aspirator body.

Those skilled in the art will appreciate embodiments other than the drag assemblies disclosed above fall within the principles of the disclosure. For example, a variety of drag bodies may be substituted for the disc, sphere and cone described above. Variations of the drag tabs are also contemplated. For example, the drag tabs may be positioned at angles of attack relative to the gas flow through the channel. Such embodiments would impart a rotational spin to the telescoping channel as it expands, helping to further engage the various tapered tube sections.

Finally, it is further understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. An aspirator system, comprising:
   an aspirator body having a longitudinal axis;
   a channel configured for telescoping expansion and contraction along the longitudinal axis, the channel having:
   a first tapered tube section having a proximal end secured to an outflow region of the aspirator body, a distal end disposed opposite the proximal end and a tapered wall extending between the proximal end and the distal end, the tapered wall having a constant wall thickness between the distal end and the proximal end and
   a second tapered tube section configured for telescoping engagement with the first tapered tube section, the second tapered tube section having a proximal end configured for frictional engagement with the distal end of the first tapered tube, a distal end disposed opposite the proximal end and a tapered wall extending between the proximal end and the distal end, the tapered wall having a constant wall thickness between the distal end and the proximal end; and
   a drag assembly secured to the distal end of the second tapered tube section, the drag assembly comprising a drag tab extending radially inward from the distal end of the second tapered tube section.

2. The aspirator system of claim 1, further comprising a third tapered tube section configured for telescoping engagement between the first tapered tube section and the second tapered tube section.

3. The aspirator system of claim 1, wherein
   the first tapered tube section comprises a distal radius and a proximal radius,
   the second tapered tube section comprises a distal radius and a proximal radius and
   the distal radius of the first tapered tube section is greater in value than the proximal radius of the second tapered tube section.

4. The aspirator system of claim 1, wherein the drag assembly comprises a plurality of drag tabs spaced about a perimeter of the distal end of the second tapered tube section of the channel.

5. The aspirator system of claim 4, wherein the plurality of drag tabs is spaced equidistantly about the perimeter of the distal end of the second tapered tube section of the channel.

6. The aspirator system of claim 1, wherein the drag assembly comprises a disc disposed proximate a center portion of the drag assembly.

7. The aspirator system of claim 6, wherein the drag tab has a circumferential width and wherein the disc has a diameter equal in size to the circumferential width.

8. The aspirator system of claim 1, wherein the distal end of the second tapered tube section defines a distal radius and wherein the drag tab has a radial length less than the distal radius.

9. The aspirator system of claim 8, wherein the drag assembly comprises a plurality of drag tabs each having a radial length less than the distal radius.

10. The aspirator system of claim 9, wherein the drag assembly includes a disc disposed perpendicular to the longitudinal axis.

11. The aspirator system of claim 10, wherein each of the plurality of drag tabs has a first end secured to the second tapered tube section and a second end secured to the disc.

12. An aspirator system, comprising:
    an aspirator body having a longitudinal axis;
    a channel configured for telescoping expansion and contraction along the longitudinal axis, the channel having:
    a first tapered tube section having a proximal end secured to an outflow region of the aspirator body, a distal end disposed opposite the proximal end and a tapered wall extending between the proximal end and the distal end, the tapered wall having a constant wall thickness between the distal end and the proximal end and
    a second tapered tube section configured for telescoping engagement with the first tapered tube section, the second tapered tube section having a proximal end configured for frictional engagement with the distal end of the first tapered tube, a distal end disposed opposite the proximal end and a tapered wall extending between the proximal end and the distal end, the tapered wall having a constant wall thickness between the distal end and the proximal end; and a drag assembly secured to the second tapered tube section, the drag assembly comprising a drag body disposed at a location radially inward of the distal end of the second tapered tube section.

13. The aspirator system of claim 12, wherein the drag assembly comprises a plurality of spokes.

14. The aspirator system of claim 13, wherein each of the plurality of spokes has a first end secured to the distal end of the second tapered tube section and a second end secured to the drag body.

15. The aspirator system of claim 14, wherein the drag body is a hemisphere.

16. The aspirator system of claim 14, wherein the drag body is a disc.

17. An aspirator system, comprising:
an aspirator body having a longitudinal axis;
a channel configured for telescoping expansion and contraction along the longitudinal axis, the channel having:
a first tapered tube section having a proximal end secured to an outflow region of the aspirator body, a distal end disposed opposite the proximal end and a first tapered wall extending between the proximal end and the distal end, the first tapered wall having a constant wall thickness between the distal end and the proximal end,
a second tapered tube section positioned coaxially and configured for telescoping engagement with the first tapered tube section, the second tapered tube section having a proximal end configured for frictional engagement with the distal end of the first tapered tube, a distal end disposed opposite the proximal end and a second tapered wall extending between the proximal end and the distal end, the second tapered wall having a constant wall thickness between the distal end and the proximal end,
a third tapered tube section positioned coaxially and configured for telescoping engagement with the second tapered tube section, the third tapered tube section comprising a proximal end and a distal end and a third tapered wall extending between the proximal end and the distal end, the third tapered wall having a constant wall thickness between the distal end and the proximal end,
a fourth tapered tube section positioned coaxially and configured for telescoping engagement with the third tapered tube section, the fourth tapered tube section comprising a proximal end and a distal end and a fourth tapered wall extending between the proximal end and the distal end, the fourth tapered wall having a constant wall thickness between the distal end and the proximal end; and
a drag assembly secured to the distal end of the fourth tapered tube section, the drag assembly comprising a drag tab extending radially inward from the distal end of the fourth tapered tube section.

18. The aspirator system of claim 17, wherein
the first tapered tube section comprises a distal radius measured from the longitudinal axis to a radially outer surface of the first tapered wall at the distal end of the first tapered wall,
the second tapered tube section comprises a proximal radius measured from the longitudinal axis to a radially inner surface of the second tapered wall at the proximal end of the second tapered wall and
the distal radius of the first tapered tube section is greater in value than the proximal radius of the second tapered tube section.

19. The aspirator system of claim 18, wherein the drag assembly comprises a plurality of drag tabs.

* * * * *